June 21, 1932.　　　D. A. MEEKER　　　1,864,209

FOOD HANDLING APPARATUS

Filed March 27, 1930　　　2 Sheets-Sheet 1

INVENTOR
David A. Meeker
BY Maréchal and Noe
ATTORNEYS

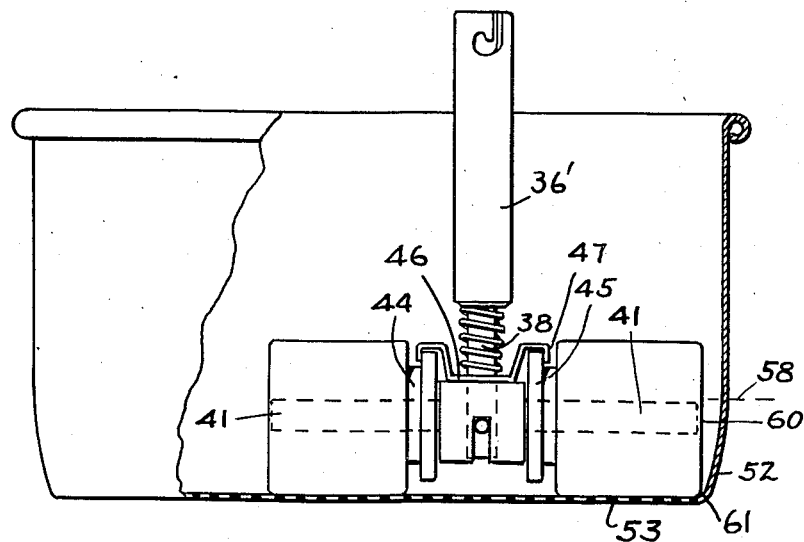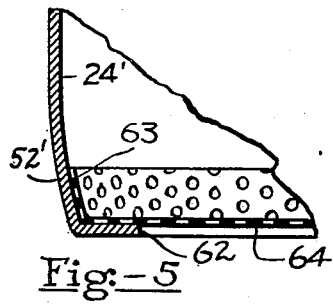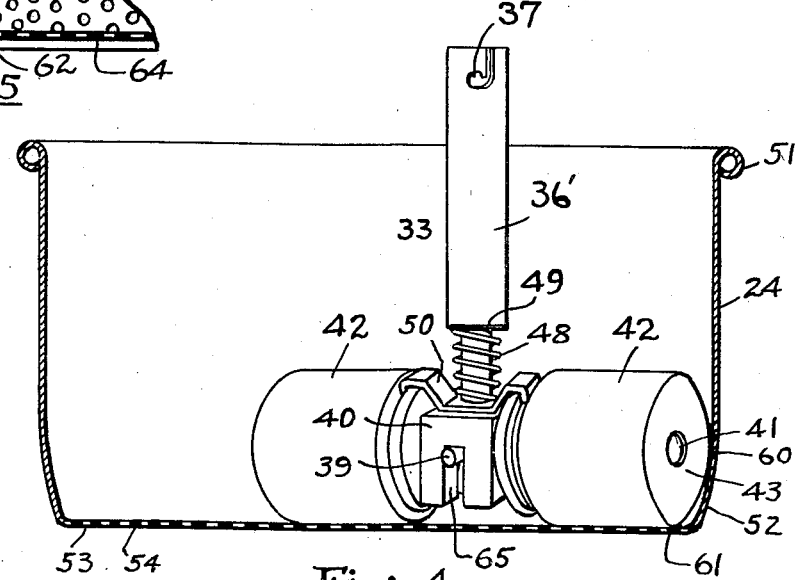

Patented June 21, 1932

1,864,209

UNITED STATES PATENT OFFICE

DAVID A. MEEKER, OF TROY, OHIO, ASSIGNOR TO THE HOBART MANUFACTURING COMPANY, OF TROY, OHIO, A CORPORATION OF OHIO

FOOD HANDLING APPARATUS

Application filed March 27, 1930. Serial No. 439,507.

This invention relates to food treating apparatus and particularly to apparatus used for straining, crushing or otherwise treating foodstuffs.

One of the principal objects of the invention is to provide shaft driven apparatus of this character having a container wherein the entire quantity of food under treatment will be subject to effective action of the apparatus.

Another object of the invention is to provide power driven apparatus of this character having a driven shaft with a planetary movement, with a straining or colander roller and bowl constructed so that the roller in its planetary movement sweeps substantially the entire lower side and bottom wall surface of the bowl.

Another object of the invention is the provision of a container or colander bowl which may be used effectively as an attachment for a power driven mixing machine, which is both strong and durable, and which may be easily disassembled and cleaned.

Other objects and advantages of the invention will be apparent from the following description, the accompanying drawings, and the appended claims.

In the drawings, in which like characters of reference designate like parts in the several views thereof—

Fig. 3 is an enlarged elevational view, partially in section of the container and food treating member shown in Fig. 1;

Fig. 4 is a view similar to Fig. 3 with the food treating member in a diagonal position of its planetary movement; and Fig. 5 is a fragmentary vertical sectional view of a modified form of container.

Figure 2:
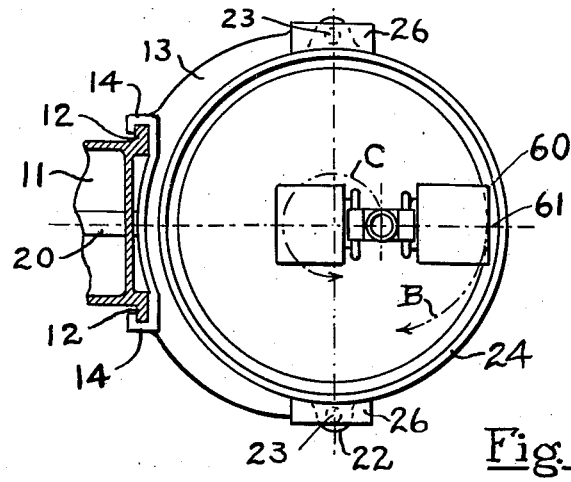
Fig. 2 is a horizontal section on the line 2—2 of Fig. 1.

Referring more particularly to the drawings, in which are illustrated preferred embodiments of the invention, the numeral 10 indicates the base of a food treating machine, shown as a conventional type of cake mixing machine, to which is attached a pedestal 11. The pedestal 11 is provided with parallel guides 12 slidably receiving the slides 14 carried by the semi-circular bowl lift support or yoke 13. A shaft 16 is rotatably mounted within the pedestal 11 and carries a crank arm 17 pivotally connected to a link 18, which in turn is pivotally connected to a rearwardly extending arm 20 rigidly carried by the slide and yoke 13 and extending through an elongate slot in pedestal 11 to the interior thereof. Arm 20 is provided with a bore through which loosely passes the link 18, the arm 20 being supported on a collar 19 slidably mounted on link 18 and resiliently urged against the arm by spring 15 mounted between collar 19 and a nut 19' threaded on the lower end of link 18. The shaft 16 also carries an operating crank 21, upon actuation of which the yoke 13 is vertically raised or lowered upon the guides 14 of pedestal 11. The yoke 13 is provided with spaced pads 22 carrying upwardly extending pins 23 for the support of a container or colander bowl 24, which is held thereon by ears 25 attached to the container walls and provided with openings receiving pins 23. The ears 25 may be formed, as shown, as part of carrying handles 26 of the container.

Figure 1:
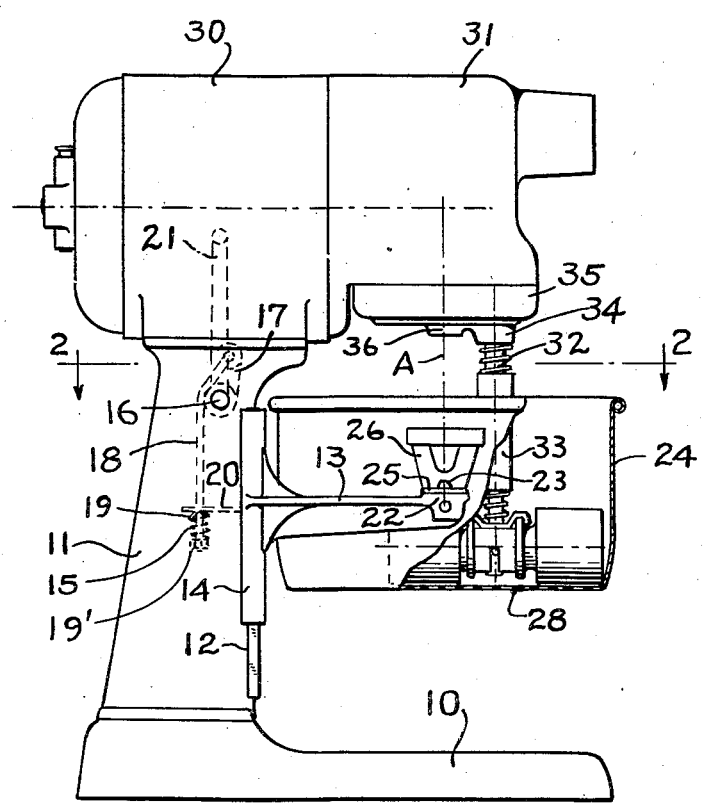
Fig. 1 is a side elevational view of apparatus constructed in accordance with this invention, parts being broken away and in section to illustrate the construction thereof.

The pedestal 11 supports an electric motor 30 to which is attached a gear casing 31. A driven shaft 32 depends from the casing 31 for the attachment of various food treating devices such as the colander roller 33. Any suitable drive means, such as conventional gearing and change speed mechanism as is customarily used in cake mixing machines, may be provided within the housing 31 between the driving motor 30 and the driven shaft 32. As the details of construction of this gearing and change speed mechanism form no part of the present invention, this is not illustrated in greater detail herein. The driven shaft 32 is supported for rotational movement within the sleeve 34 of a rotatable plate 35 carried by central shaft 36. Shaft 32, being eccentrically mounted with respect to the axis of the plate 35, is not only adapted to rotate upon its own axis but also rotates about the axis of the plate; the axis of the plate being indicated by the center line A of Fig. 1. Planetary gearing for producing the above described movement is well known in the mixer art, and as any suitable conventional form may be used, this is not illustrated in greater detail herein Food treating members which may be attached to the shaft 32 will therefore describe a planetary path.

When the container is positioned upon its supporting yoke the bottom of the container lies substantially perpendicular to the axis of the shaft 32. Supported within bowl 24 by shaft 32 is a suitable type of colander roller, the one illustrated being similar to that shown in the patent to Miller, No. 1,563,389, dated December 1, 1925. As shown, this roller is provided with a stem portion 36' attached at one end by means of a bayonet or other suitable connection 37 to shaft 32 to rotate therewith. The lower end of stem 36' carries a shaft portion 38 of reduced diameter carrying a cross pin 39, and slidably mounted on shaft 38 is a head 40 having a downwardly opening slot 65 receiving cross pin 39, whereby head 40 is rotatably connected to shaft 38. Head 40 carries transversely disposed roller shafts 41 on which are rotatably mounted cylindrical rollers 42 having circular outer ends 43 which extend somewhat beyond the ends of shafts 41. Rollers 42 are provided with inner extensions 44 carrying annular flange rims 45. A locking plate 46 which is longitudinally slidable on shaft 38 is provided at its ends with downturned lips 47 which overlie the annular flanges 45 to retain rollers 42 on their respective shafts 41. A spring 48 bearing at one end on a shoulder 49 at the lower end of stem 36', and at its other end against locking plate 46 urges the head 40 and rollers 42 downwardly into engagement with food to be treated adjacent the bottom of the container 24, this downward movement being limited by engagement of the upper end of slot 65 with pin 39. Locking plate 46 is formed with upwardly inclined portions 50 so that the plate does not bear in frictional contact with the annular flanges 45 of rollers 42.

Container or colander bowl 24 is formed with a solid side wall having an upper bead 51 and a lower curved portion 52 connected to a flat bottom plate 53 which is perforated as indicated at 54. Food to be treated is placed within bowl 24, and then motor 30 is started to drive shaft 32 and colander roller 33 in a planetary movement. Thus shaft 32 rotates about the axis A, as indicated by the arrow C in Fig. 2, at the same time that the roller 33 rotates about its own axis 32, so that a point on the axis of shaft 41 of roller 42 describes a path indicated by the dash and dot line B. The movement of rollers 42 urged downwardly under the action of spring 48 imparts a crushing and scraping action to the food as the rollers are rotated within the container. This action separates the juices from the solid portion of the foodstuffs under treatment and the perforate bottom portion 53 of the container permits draining off of the separated juices while the solid portions are held within the container.

The curvature of the lower portion 52 of the side wall of the container bears a concentric relationship to the circumference of the path covered by the rollers in their planetary movement; the curvature of the side wall being coordinated therewith to eliminate any areas where untreated foodstuffs may collect between the outward sweep of the rollers during their movement and the wall of the container. In other words, the curved portion 52 of the lower side wall of the container is such as to substantially form the outer bounding surface or periphery of the imaginary solid circumscribing the positions assumed by the rollers in all of their positions of movement, a small operating clearance being of course provided. The yoke 13 and bowl 24 are so arranged and proportioned that the bowl is mounted with its longitudinal center line substantially in alignment with the axis A of the planetary movement of the colander roller. Thus the rollers in rotating about their own axis and also about the axis of the plate 35 serve to scrape off any material adhering to the lower side wall of the interior of the container. The inward curvature of the side wall begins at a height somewhat above the height of the horizontal axis of the rollers as indicated at 58, and continues to the bottom of the container.

When the colander roller axis is in alignment with a diameter of the bowl 24, as shown in Figs. 2 and 3, then a point 60 on the outer periphery of the roller in the horizontal plane of the horizontal longitudinal axis of the roller is somewhat spaced from the lower side wall of the bowl. But as the colander roller rotates on its own axis from this position of alignment to a diagonal position, indicated in Fig. 4 and in dotted lines in Fig. 2, then a point 60 on the outer periphery of the roller in the horizontal plane of the roller axis has moved the maximum distance outwardly that any portion of the roller attains. And other points on this peripheral edge of the roller immediately below the horizontal axis of the roller at this time have moved outwardly progressively decreasing distances, as indicated in Fig. 4. A point 61 at the bottom of the roller in alignment with the vertical plane passing through the longitudinal axis of the roller has moved outwardly its maximum distance when the roller is in the position shown in Figs. 2 and 3, and as the roller moves to the diagonal position of Fig. 4 this point has moved inwardly a small distance. Points on the peripheral surface of the roller between the imaginary points 60 and 61 thus move outwardly their maximum distances at various positions of the roller intermediate the radial position of the roller shown in Fig. 2 and the diagonal position shown in Fig. 4. The periphery of the outer side of the imaginary solid which bounds the maximum sweep of the roller in its planetary movement therefore has a peculiar curvature; and the lower portion 52 of the bowl is given this peculiar curvature as is clearly illustrated in Figs. 3 and 4, and may be substantially coincident with this bounding periphery of the imaginary solid.

The curvature of the bottom portion of the side walls of the container, therefore, is so coordinated with the shape and planetary movement of the roller as to approximate the imaginary curve which represents the outer sweep of that portion of the end of the roller below the roller center line. The curvature of this portion 52 of bowl 24 is continued upwardly to the horizontal plane of line 58 above the horizontal center line of the roller, so that a somewhat greater clearance is provided between this upper portion of the bowl and the colander roller. Thus when food is first placed within the bowl and the roller is working on top of this food and spaced somewhat from the bottom 53 of the bowl, a greater effective clearance may be satisfactorily provided. But as the roller in its continued movement crushes and scrapes the food and thus works its way to the bottom of the bowl, the bounding periphery of its movement very closely approaches the curved inner surface of the lower portion of the bowl. This construction prevents the formation of dead pockets or spaces adjacent the bottom of the bowl in which untreated food can accumulate and therefore provides a more effective and rapid separating action of the food being treated.

While the roller thus effectively scrapes the food being treated from the entire lower side wall and bottom of the bowl 24 during its planetary movement, only a small peripheral point or edge of the roller is in its maximum outward scraping movement at any instant of its travel. And due to the character of the planetary movement, the roller describes many rotations on its own axis and about the axis of the planetary before it again assumes the same identical position within the bowl, this being dependent upon the particular planetary gearing used. Thus the roller scrapes a different portion of the side wall of the bowl on each rotation thereof for as many as fifty or more rotations, until it again comes back to the identical starting position. While two rollers 42 having their outer ends spaced equal distances from the axis of shaft 32 are illustrated, it is obvious that one roller may be shorter than the other and only the longer roller used to effect the scraping action of the food from the side wall of the bowl. Also, while cylindrical rollers with plane surfaced circular ends have been shown, other forms of rollers may be provided and the shape of the lower side wall of the bowl coordinated with the planetary movement thereof so as to closely circumscribe the imaginary solid bounded by the extreme outer positions of the sweep of the colander rollers.

In Fig. 5 a modified form of container construction is illustrated in which a separate perforate bottom member 64 is provided within the container 24' which is constructed similarly to the container 24, having an imperforate side wall with a lower curved portion 52'. At the bottom, the curved side wall is provided with a short inwardly extending flange 62 forming a circular opening over which is positioned the separate bottom member 64 supported on flange 62. Member 64 is provided with a short upwardly and outwardly flaring flange 63 adapted to assume substantially the same curvature as the wall portion 52'. Due to the continued upward and outward flare of the wall 52' above the periphery of the top of flange 63, the maximum outside diameter of the separate bottom member is substantially less than the inner diameter of the side wall of the container above the extreme lower portion within which the removable bottom seats, so that this bottom may be readily inserted downwardly into operating position with the flange 63 wedged in and forming a seal with the curved side wall of the bowl. The removable bottom 64 is preferably made of stamped sheet metal, and the flange 63 may have a somewhat greater outward flaring curvature than the wall 52' of the bowl so that the flange 63 springs into place upon insertion of the bottom member to hold the member securely in position within the bowl. The bottom member may be removed from the bowl by a slight blow against the bottom side which disengages the flange 63 from the side wall of the container and permits the bottom member to be removed upwardly through the bowl. The difference in the diameters of the flange 63 and of the side wall of the container is such as to prevent any objectionable binding during removal. Flange 63 fits snugly against the lower wall of the container so that the ends of the colander rollers will cooperate with this flange and with the curved portion 52' of the bowl above the flange in the same manner as the rollers in Figs. 1 to 4 cooperate with the curved portion 52 of the container 24. The rollers 40 thus work down in the bottom of the flange 53 of the construction of Fig. 5, and there is practically no dead space for the accumulation of untreated foodstuffs. The ready removability of the bottom member facilitates cleaning of the bowl, and also permits different members with various sizes of perforations or straining surfaces to be used with a single bowl and colander attachment.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a machine of the character described having a driven shaft having both rotary and bodily translational movements, and a scraping and crushing roller carried by said shaft; a container adapted to receive foodstuffs and to be operated upon by said roller, comprising a side wall having an inwardly curving bottom portion and a perforate bottom wall, the curvature of said bottom portion simulating the outer bounding surface of the imaginary solid circumscribing the sweep of said roller as it is moved within said container by said driven shaft in its rotary and bodily translational movements, whereby substantially no available dead space is provided within the lower portion of said container for the accumulation of foodstuffs not subject to the action of said roller in its movement.

2. In a machine of the class described having a driven planetary shaft, and a scraping and crushing roller carried by said shaft; a container adapted to receive foodstuffs to be operated upon by said roller, comprising a cylindrical side wall having an inwardly curving lower portion and a perforate bottom wall, the container being adapted to be mounted with its central longitudinal axis in alignment with the axis of movement of said planetary shaft, the curvature of said lower portion simulating the outer bounding surface of the imaginary solid circumscribing the sweep of said roller as it is moved in a planetary path within said container by said planetary shaft, whereby substantially no available dead space is provided within the lower portion of said container for the accumulation of foodstuffs not subject to the action of said roller in its planetary movement.

3. In a machine of the class described having a depending driven planetary shaft, and a cylindrical scraping and crushing roller having an outer plane circular end carried by said planetary shaft with the longitudinal axis of said roller substantially at right angles to the longitudinal axis of said depending planetary shaft; a container adapted to receive foodstuffs to be operated upon by said roller comprising a cylindrical side wall open at its upper end to receive the said depending shaft and roller, said container having an inwardly curving lower portion connected to said side wall and a perforate bottom wall, the container adapted to be mounted with its central longitudinal axis in alignment with the axis of movement of said planetary shaft, the curvature of said lower portion simulating the outer bounding surface of the imaginary solid circumscribing the sweep of the outer plane circular end of said roller as it is moved in a planetary path within said container by said planetary shaft, the curvature of said lower portion extending upwardly at least to the plane of the longitudinal axis of said roller, whereby substantially no available dead space is provided within the lower portion of said container for the accumulation of foodstuffs not subject to the action of said roller in its planetary movement.

4. In a mixing device having a planetary shaft and a roller carried by said planetary shaft: a container adapted to receive foodstuffs to be operated upon by said roller, said container having a side wall curved to simulate and circumscribe the maximum outward distances of travel of points on the outer end of said roller during its planetary movement within said container, whereby the roller serves to scrape off foodstuffs tending to adhere to said wall to prevent the undesirable accumulation of foodstuffs in said container beyond the periphery of the path swept by said roller during its movement.

In testimony whereof I hereto affix my signature.

DAVID A. MEEKER.